(12) United States Patent
Lee et al.

(10) Patent No.: US 11,807,085 B2
(45) Date of Patent: Nov. 7, 2023

(54) SLIDING DOOR DEVICE FOR VEHICLE

(71) Applicants: Hyundai Motor Company, Seoul (KR); Kia Corporation, Seoul (KR)

(72) Inventors: Jaeseung Lee, Hwaseong-Si (KR); Sangheon Lee, Seoul (KR); Soo Bok Kim, Incheon (KR); Jin Pyung Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/885,308

(22) Filed: Aug. 10, 2022

(65) Prior Publication Data

US 2023/0173897 A1 Jun. 8, 2023

(30) Foreign Application Priority Data

Dec. 8, 2021 (KR) .......................... 10-2021-0174822

(51) Int. Cl.
*B60J 5/06* (2006.01)
*E05D 15/10* (2006.01)

(52) U.S. Cl.
CPC ............. *B60J 5/06* (2013.01); *E05D 15/101* (2013.01)

(58) Field of Classification Search
CPC .......... B60J 5/06; E05D 15/30; E05D 15/101; E05D 2015/1026
USPC ........................................................ 296/155
See application file for complete search history.

(56) References Cited

U.S. PATENT DOCUMENTS

| | | | | |
|---|---|---|---|---|
| 9,587,724 B2* | 3/2017 | Choi | ....................... | E05D 15/58 |
| 9,777,811 B2* | 10/2017 | Choi | ..................... | E05D 15/101 |
| 11,384,580 B2* | 7/2022 | Yun | ............................. | B60J 5/06 |
| 11,505,045 B2* | 11/2022 | Yun | ....................... | E05D 15/101 |
| 11,555,343 B2* | 1/2023 | Yun | .......................... | B60J 5/047 |
| 2021/0079703 A1* | 3/2021 | Yun | ........................ | E05D 15/30 |
| 2022/0412142 A1* | 12/2022 | Lee | ......................... | E05D 15/58 |
| 2023/0182550 A1* | 6/2023 | Lee | ............................ | B60J 5/06 |
| | | | | 296/155 |
| 2023/0184015 A1* | 6/2023 | Lee | ............................ | B60J 5/06 |
| | | | | 296/155 |
| 2023/0202272 A1* | 6/2023 | Lee | ....................... | E05D 15/101 |
| | | | | 49/70 |
| 2023/0202273 A1* | 6/2023 | Lee | ............................ | B60J 5/06 |
| | | | | 296/146.1 |

* cited by examiner

*Primary Examiner* — Jason S Morrow
(74) *Attorney, Agent, or Firm* — MORGAN, LEWIS & BOCKIUS LLP

(57) ABSTRACT

A sliding door device for a vehicle, includes: a door that opens or closes a door opening formed in a vehicle body; a door arm provided with a first end portion rotatably connected to the door and a second end portion movable along a side sill of the vehicle body; a first slider pivotally coupled to the second end portion of the door arm so that the door arm rotates; a second slider coupled to the first slider to provide a path in which the first slider moves and to linearly move along the side sill; and a lower arm pinion gear which is rotatably coupled to the second end portion of the door arm and gear-engaged with the second slider to provide rotation force to the door arm so that the door arm rotates when the first slider moves in a longitudinal direction of the second slider.

16 Claims, 15 Drawing Sheets

SLIDING DOOR DEVICE FOR VEHICLE

CROSS-REFERENCE TO RELATED APPLICATION

The present application claims priority to Korean Patent Application No. 10-2021-0174822 filed on Dec. 8, 2021, the entire contents of which is incorporated herein for all purposes by this reference.

BACKGROUND OF THE PRESENT DISCLOSURE

Field of the Present Disclosure

The present disclosure relates to a sliding door device for a vehicle, and more particularly, to a sliding door device for a vehicle which may open or close a door opening of a vehicle body by sliding forwards and backwards in a longitudinal direction of the vehicle.

Description of Related Art

Generally, a vehicle has a predetermined sized cabin formed therein for boarding of a driver and accompanying occupants therein, and cabin opening/closing doors mounted to the vehicle body for opening/closing the cabin.

In a case of a passenger vehicle, the cabin opening/closing doors are front doors mounted to a front side of the vehicle in the longitudinal direction of the vehicle, and rear doors mounted to a rear side of the vehicle in the longitudinal direction of the vehicle, wherein, in general, the front doors and the rear doors are rotatably mounted to the vehicle body with hinges.

In a case of a van in which many people may board, the cabin opening/closing door opens or closes the cabin as the cabin opening/closing door slides forward/backward in the longitudinal direction of the vehicle.

Since the sliding type of cabin opening/closing door in the van opens the cabin as the cabin opening/closing door moves backward in the longitudinal direction of the vehicle, and closes the cabin as the cabin opening/closing door moves forward in the longitudinal direction of the vehicle, the sliding type of cabin opening/closing door in the van has a smaller space requirement for opening/closing the door than the hinge type of cabin opening/closing door in the passenger vehicle, to have an advantage of opening the door opening formed in the vehicle body completely even in an opening/closing space with a small width.

However, in the conventional sliding type of cabin opening/closing door, when opening/closing the door, due to the fixed sliding door arm structure, the space in which the door arm undesirably enters the side sill portion of the vehicle is excessive, thus the floor height of the vehicle must be increased to secure the space.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sliding door device for a vehicle which may solve the problem in which the space in which the door arm undesirably gets into the side sill portion of the vehicle is excessive, by employing a sliding door structure to which a rack/pinion gear engaging structure is applied.

Various aspects of the present disclosure are directed to providing a sliding door device for a vehicle, including: a door that opens or closes a door opening formed in a vehicle body; a door arm provided with a first end portion rotatably connected to the door and a second end portion movable along a side sill of the vehicle body; a first slider pivotally coupled to the second end portion of the door arm so that the door arm rotates; a second slider coupled to the first slider to provide a path in which the first slider moves and to linearly move along the side sill; and a lower arm pinion gear which is rotatably coupled to the second end portion of the door arm and gear-engaged with the second slider to provide rotation force to the door arm so that the door arm rotates when the first slider moves in a longitudinal direction of the second slider.

In the second slider, a lower arm rack gear formed in a longitudinal direction of the side sill to be engaged with the lower arm pinion gear to provide a moving path when the lower arm pinion gear rotates may be formed.

The first slider may be located between the second slider and the lower arm pinion gear, and the lower arm pinion gear may be engaged to the lower arm rack gear through an opening formed in the first slider.

The lower arm pinion gear may rotate along the lower arm rack gear until the door arm is disposed in a direction perpendicular to the door when the door is opened and closed, and may stop rotating after the door arm is disposed in the direction perpendicular to the door.

The second slider may linearly move along the side sill after the door arm is disposed in the direction perpendicular to the door.

At a first end portion of the second slider, a first slider locker that selectively limits a moving path of the first slider and selectively fixes the first slider to the second slider may be provided.

When the door is opened, the first slider locker may rotate as it comes into contact with the first slider at the first end portion of the second slider by movement of the first slider so that the second slider may be uncoupled from the side rail of the side sill.

When the door is closed, the first slider locker may have elastic force to rotate to an original position thereof as it is released from contact with the first slider at the first end portion of the second slider by movement of the first slider.

The first slider locker may rotate to the original position thereof, so that the second slider may be coupled to the side rail of the side sill.

A first slider stopper that prevents the first slider from being separated from the second slider may be provided in the side sill.

At a first end portion of the second slider in contact with the first slider stopper, a rocker pusher extending through an end portion of the second slider to be movable in a longitudinal direction of the second slider may be provided; at a second end portion of the second slider, a second slider locker that rotates when in contact with the locker pusher may be provided; and the locker pusher may rotate the second slider locker so that the first slider may be fixed to or unfixed from the second slider.

When the door is closed, the locker pusher may contact with the second slider locker to rotate the second slider locker so that the second slider locker may be unlocked from the first slider.

When the door is opened, the locker pusher may contact with the second slider locker to rotate the second slider locker so that pressure by the first slider stopper may be released and the second slider locker may be fixed to the first slider.

A second end portion of the door arm, the first slider, and the lower arm pinion gear may be connected in a vertical direction of the vehicle body by a slider pin, and the door arm and the lower arm pinion gear may be rotated around the slider pin.

A second end portion of the door arm may be provided with two layers in a vertical direction thereof, and the lower arm pinion gear may be coupled by the slider pin between the first and second layers of the door arm.

A first end portion of the door arm may be connected to the door by a door pin to be able to be hinge-rotated.

According to the exemplary embodiment of the present disclosure, by employing a sliding door structure to which a rack/pinion gear engaging structure is applied, it is possible, by eliminating an amount of intrusion into a vehicle body of a door arm, to realize a flat structure of the vehicle body, and thus it is possible to reduce a step height of the vehicle body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
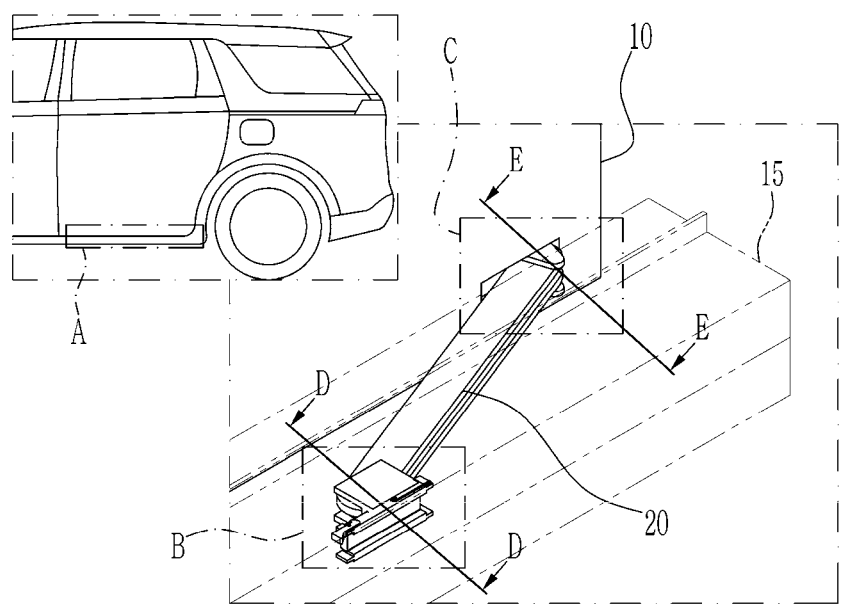
FIG. 1 illustrates a schematic view of a sliding door device for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

Furthermore, with embodiments of the present disclosure, detailed description is made of as to constituent elements in various exemplary embodiments with reference to the relevant drawings by use of the same reference numerals for the same constituent elements, while only different constituent elements from those related to the various exemplary embodiments are described in other exemplary embodiments of the present disclosure.

The drawings are schematic, and are not illustrated in accordance with a scale. Relative dimensions and ratios of portions in the drawings are illustrated to be exaggerated or reduced in size for clarity and convenience, and the dimensions are just examples and are not limiting. Furthermore, like structures, elements, or components illustrated in two or more drawings use same reference numerals for showing similar features. It will be understood that when an element such as a layer, film, region, area, or substrate is referred to as being "on" another element, it may be directly on the other element or intervening elements may also be present.

The exemplary embodiment of the present disclosure shows various exemplary embodiments of the present disclosure in detail. As a result, various modifications of the drawings will be expected. Therefore, the exemplary embodiments are not limited to a specific shape of an illustrated region, but, for example, include a change in the shape in accordance with manufacturing.

Hereinafter, a structure of a sliding door device for a vehicle according to various exemplary embodiments of the present disclosure will be described in detail with reference to the accompanying drawings.

Figure 2:
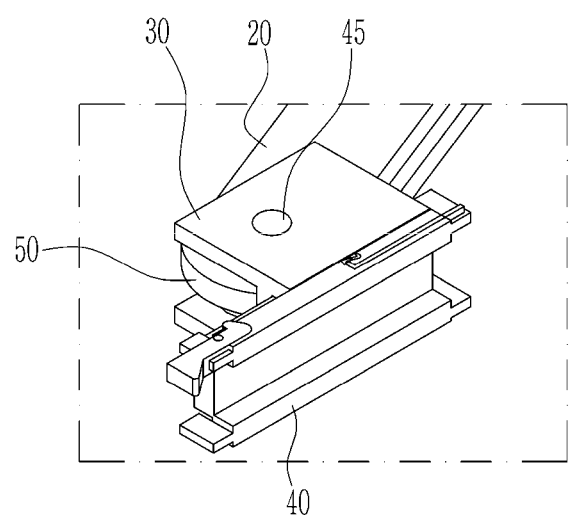
FIG. 2 illustrates an enlarged view of a portion 'B' of FIG. 1.
Figure 3:
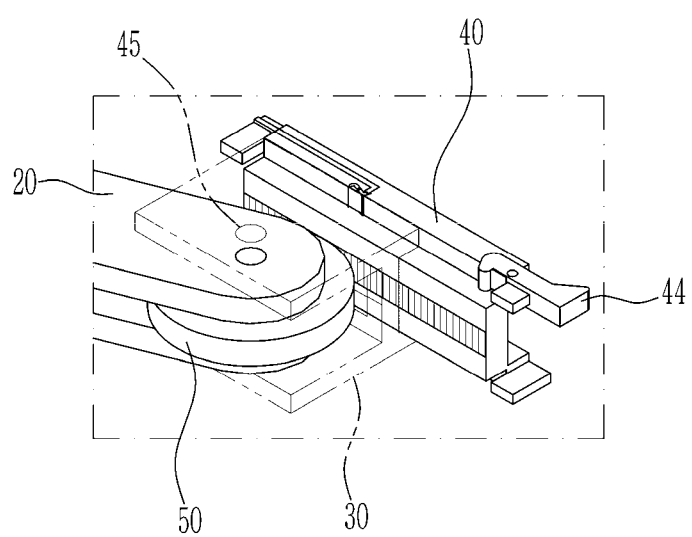
FIG. 3 illustrates a state in which the enlarged view of the portion 'B' of FIG. 1 is viewed at another angle.

FIG. 1 illustrates a schematic view of a sliding door device for a vehicle according to various exemplary embodiments of the present disclosure, FIG. 2 illustrates an enlarged view of a portion 'B' of FIG. 1, and FIG. 3 illustrates a state in which the enlarged view of the portion 'B' of FIG. 1 is viewed at another angle.

Referring to FIG. 1, a sliding door device for a vehicle according to various exemplary embodiments of the present disclosure may be applied to a lower side of a rear door 10 provided at the rear of a vehicle in a longitudinal direction thereof, that is, a portion 'A', and it may be applied to a structure in which the rear door 10 is opened or closed by movement in internal and external directions of the vehicle and forward and backward sliding movement in the longitudinal direction of the vehicle.

A sliding door device for a vehicle according to various exemplary embodiments of the present disclosure includes a door 10, a door arm 20, a first slider 30, a second slider 40, and a lower arm pinion gear 50.

The door 10 opens or closes a door opening formed in a vehicle body of the vehicle, and the door arm 20 is connected to the door 10 and the vehicle body. One end portion of the door arm 20 may be rotatably connected to one side of the door 10, and the other end portion of the door arm 20 may be movably connected along a side sill 15 of the vehicle body. The side sill 15 may be disposed at a lower portion of a side of the vehicle body in the longitudinal direction of the vehicle body, and the side sill 15 may be provided with a side rail that provides a path so that the other end portion of the door arm 20 is movable.

Referring to FIG. 2 and FIG. 3, the first slider 30 is coupled to the other end portion of the door arm 20, and the other end portion of the door arm 20 may be rotated with respect to the first slider 30. Furthermore, the second slider 40 is movably coupled to the first slider 30, and the second slider 40 provides a path for the first slider 30 to move. Furthermore, the second slider 40 is provided to linearly move along the side sill 15 of the vehicle body.

Furthermore, the lower arm pinion gear 50 may be rotatably coupled to the other end portion of the door arm 10 and the first slider 30, and may be gear-engaged to the second slider 40. When the first slider 30 moves in a longitudinal direction of the second slider 40, the lower arm pinion gear 50 is gear-engaged to the second slider 40 and rotates to provide rotation force to the door arm so that the door arm 20 rotates.

A lower arm rack gear 42 may be formed in the longitudinal direction of the side sill 15 on the second slider 40 on the side facing the door arm 20. The lower arm rack gear 42 engages with the lower arm pinion gear 50 to provide a moving path for the lower arm pinion gear 50, the first slider 30, and the door arm 20 when the lower arm pinion gear 50 rotates.

The first slider 30 is located between the second slider 40 and the lower arm pinion gear 50, and the lower arm pinion gear 50 may be engaged with the lower arm rack gear 42 through an opening 33 formed in the first slider 30.

On the other hand, the other end portion of the door arm 20, the first slider 30, and the lower arm pinion gear 50 may be connected in a vertical direction of the vehicle body by a slider pin 45, and the door arm 20 and the lower arm pinion gear 50 may rotate with respect to the first slider 30 around the slider pin 45.

Figure 4:
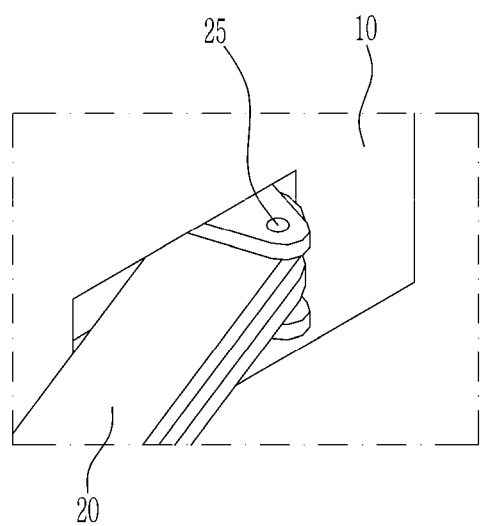
FIG. 4 illustrates an enlarged view of a portion 'C' of FIG. 1.

FIG. 4 illustrates an enlarged view of a portion 'C' of FIG. 1.

As shown in FIG. 4, one end portion of the door arm 20 may be hinge-rotatably connected to the door 10 by a door pin 25. The door pin 25 may vertically pass through one end portion of the door arm 20 through a protrusion formed in the door 10 to connect the door arm 20 to the door 10.

Figure 5:
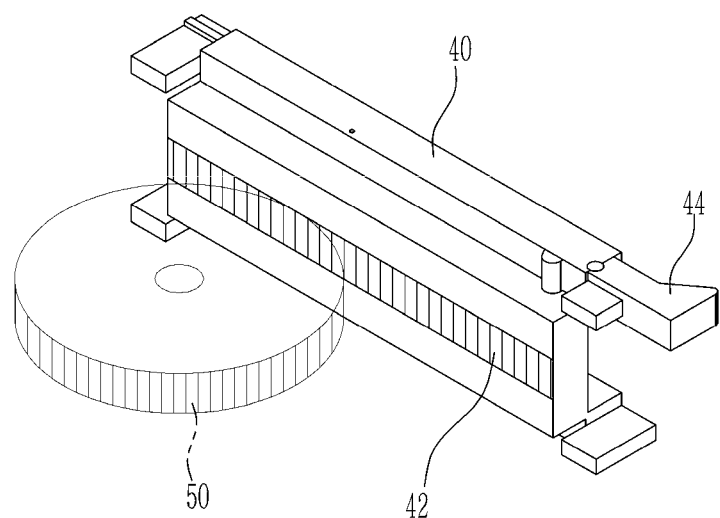
FIG. 5 illustrates a state in which a lower arm pinion gear and a lower arm rack gear of a sliding door device for a vehicle according to various exemplary embodiments of the present disclosure are engaged.

FIG. 5 illustrates a state in which a lower arm pinion gear and a lower arm rack gear of a sliding door device for a vehicle according to various exemplary embodiments of the present disclosure are engaged.

Referring to FIG. 5, the lower arm rack gear 42 is formed in a longitudinal direction of the first slider 30, and the lower arm pinion gear 50 is formed to have a shape of a circle, so that an end portion of the lower arm pinion gear 50 may be engaged with the lower arm rack gear 42. As the lower arm pinion gear 50 rotates, the first slider 30 and the door arm 20 may move along the lower arm rack gear 42 in a longitudinal direction of the second slider 40.

Meanwhile, at one end portion of the second slider 40, a first slider locker 44 may be provided to limit a path the first slider 30 moves and to fix the first slider 30 to the second slider 40. The first slider locker 44 rotates as it contacts with the first slider 30 at one end portion of the second slider 40 by the moving of the first slider 30 when the door 10 is opened, so that the second slider 40 may be disengaged from the side rail of the side sill 15. Furthermore, the first slider locker 44 may be configured with elastic force to rotate to an original position of thereof as the first slider 40 is released from contact with the first slider 30 at one end portion of the second slider 40 by the moving of the first slider 40 when the door 10 is closed. As the first slider locker 44 rotates to its original position, the second slider 40 may be engaged with the side rail of the side sill 15.

Figure 6A:
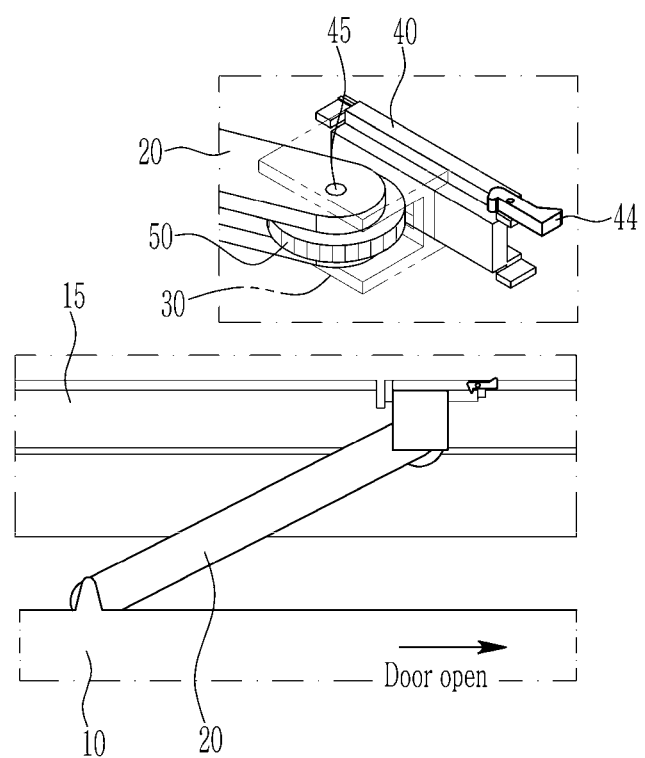
FIG. 6A and FIG. 6B illustrate operating states of a sliding door device for a vehicle according to various exemplary embodiments of the present disclosure.
Figure 6B:
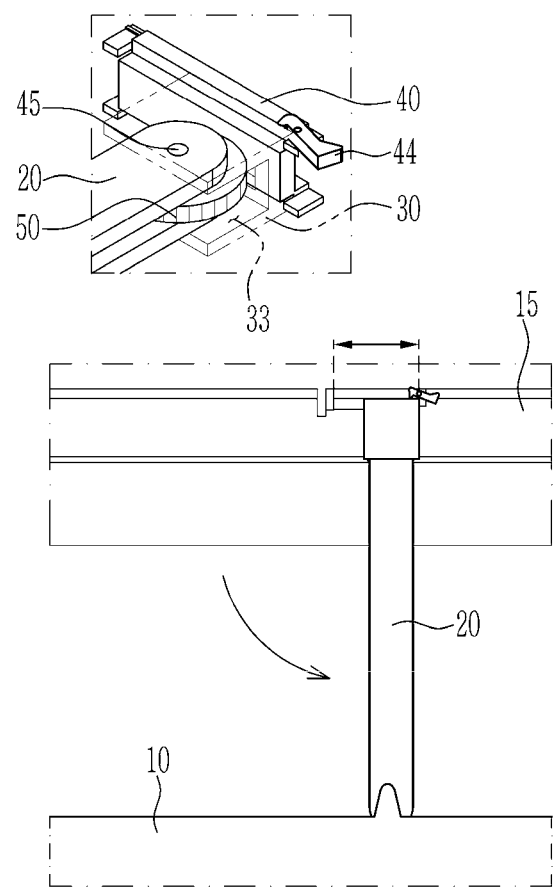

FIG. 6A and FIG. 6B illustrate operating states of a sliding door device for a vehicle according to various exemplary embodiments of the present disclosure.

Referring to FIG. 6A and FIG. 6B, in an initial state in which the door 10 of the vehicle is opened, that is, before the door arm 20 is disposed in a direction perpendicular to the door 10 (see FIG. 6A), since the first slider locker 44 is engaged with the side rail of the side sill 15, the second slider 40 does not move along the side rail.

As the first slider 30 moves toward the first slider locker 44, the lower arm pinion gear 50 is engaged with the lower rack gear 42 to rotate, and accordingly, the door arm 20 and the first slider 30 move in a longitudinal direction of the second slider 40. As the lower arm pinion gear 50 rotates, the door arm 20 is gradually turned to be close to an angle perpendicular to the door 10. After that, when the first slider 30 comes into contact with the first slider locker 44, the first slider locker 44 rotates, so that the coupling with the side rail of the side sill 15 is gradually released.

When the first slider 30 moves to one end portion of the second slider 40 (see FIG. 6B), the first slider 30 contacts with the first slider locker 44, so that the first slider locker 44 rotates, thus the first slider 30 is fixed to the second slider 40. Furthermore, the first slider locker 44 is disengaged from the side rail of the side sill 15, so that the second slider 40 may move on the side rail of the side sill 15.

After the door arm 20 is disposed in the direction perpendicular to the door 10 (see FIG. 6B), the rotation of the lower arm pinion gear 50 is stopped, and the second slider 40 linearly moves toward the rear of the vehicle along the side rail provided in the side sill 15, so that the door 10 is opened.

Figure 7:
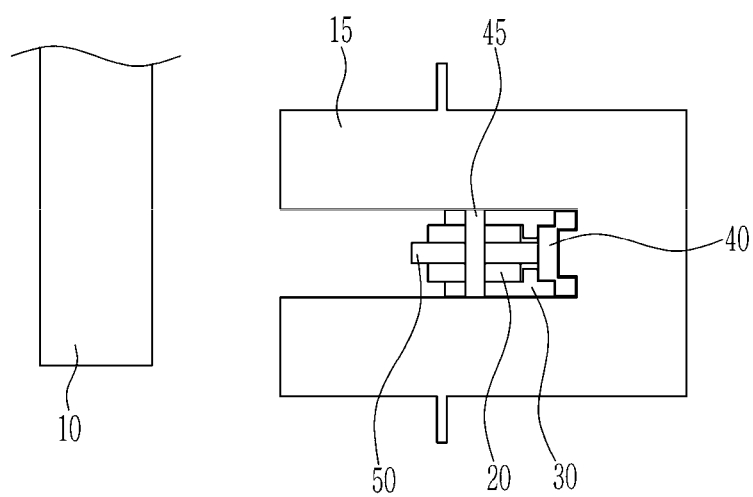
FIG. 7 illustrates a state taken along line 'D-D' of FIG. 1.
Figure 8:
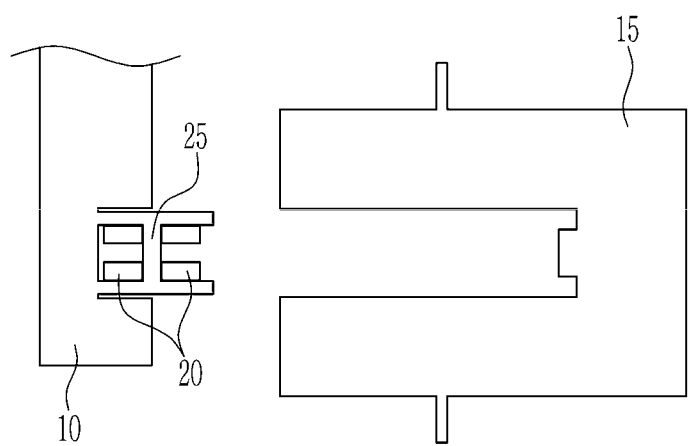
FIG. 8 illustrates a state taken along line 'E-E' of FIG. 1.

FIG. 7 illustrates a state taken along line 'D-D' of FIG. 1, and FIG. 8 illustrates a state taken along line 'E-E' of FIG. 1.

Referring to FIG. 7, the other end portion of the door arm 20 is provided with two layers in a vertical direction thereof, and the lower arm pinion gear 50 may be coupled by the slider pin 45 between the other end portions of the door arm 20 provided with the two layers. The lower arm pinion gear 50 is engaged with the lower arm rack gear 42 formed on the second slider 40, so that the door arm 20, the first slider 30, and the lower arm rack gear 42 may move along the side sill 15.

Referring to FIG. 8, one end portion of the door arm 20 may be provided with two layers in a vertical direction thereof, and may be connected to the door 10 by the door pin 25. The door pin 25 may vertically pass through one end portion of the door arm 20 through a protrusion formed in the door 10 to connect the door arm 20 to the door 10, and the door arm 20 may be hinge-rotated around the door pin 25.

Figure 9A:
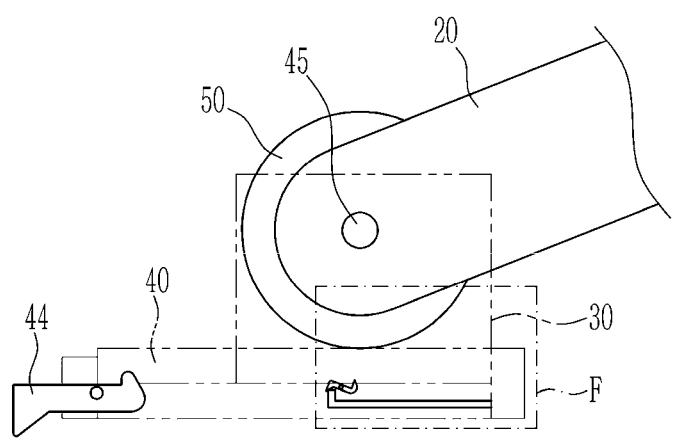
FIG. 9A, FIG. 9B and FIG. 9C illustrate states in which a first slider and a second slider are unfixed in a door closed state of a sliding door device for a vehicle according to various exemplary embodiments of the present disclosure.
Figure 9B:
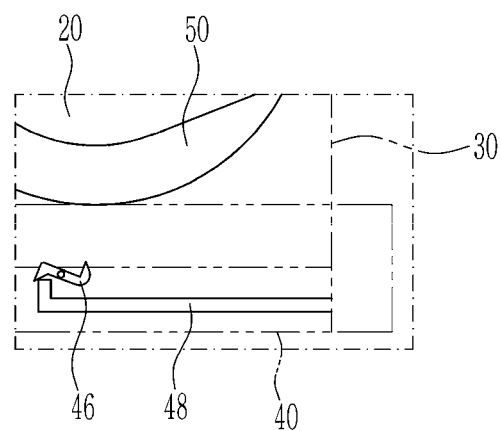
Figure 9C:
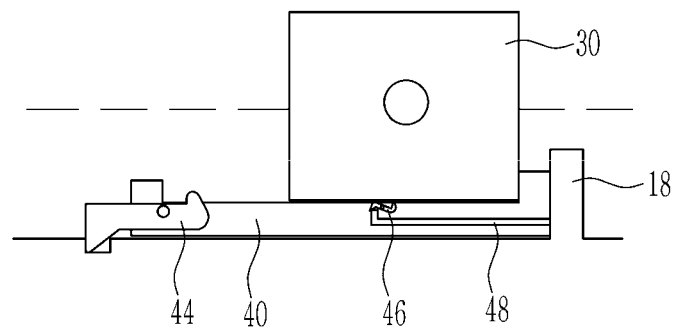

FIG. 9A to FIG. 9C illustrate states in which a first slider and a second slider are unfixed in a door closed state of a sliding door device for a vehicle according to various exemplary embodiments of the present disclosure.

Referring to FIG. 9A to FIG. 9C, the side sill 15 is provided with a first slider stopper 18 that prevents the first slider 30 from being separated from the second slider 40. Furthermore, at one end portion of the second slider 40 in contact with the first slider stopper 18, a locker pusher 48 extending through one end portion of the second slider 40 to be movable in the longitudinal direction of the second slider 40 is provided. Furthermore, at the other end portion of the second slider 40, a second slider locker 46 that rotates when in contact with the locker pusher 48 is provided. In the instant case, the locker pusher 48 contacts with and rotates the second slider locker 46, so that the first slider 30 may be fixed to or unfixed from the second slider 40.

As shown in FIG. 9A to FIG. 9C, in the state in which the door is closed, one end portion of the locker pusher 48 comes into contact with the first slider stopper 18 to be pressed, and the other end portion of the locker pusher 48 comes into contact with the second slider locker 46 to rotate it. In the instant case, the second slider locker 46 is unlocked from the first slider 30, so that the first slider 30 is unfixed from the second slider 40, and the first slider 30 is movable in the longitudinal direction of the second slider 40. Furthermore, in the instant case, as described with reference to FIG. 6A and FIG. 6B, the first slider locker 44 is coupled to the side rail, so that the second slider 40 does not move along the side rail.

Figure 10A:
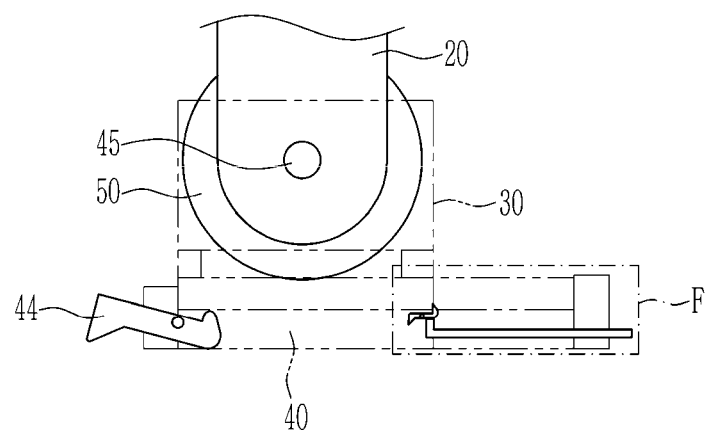
FIG. 10A, FIG. 10B and FIG. 10C illustrate states in which a first slider and a second slider are fixed in a door opened state of a sliding door device for a vehicle according to various exemplary embodiments of the present disclosure.
Figure 10B:
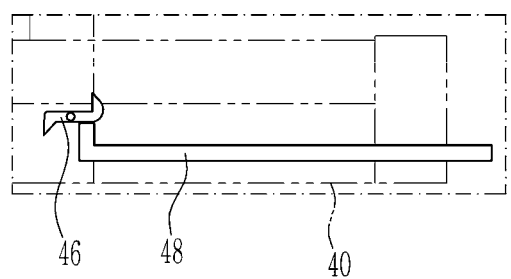
Figure 10C:
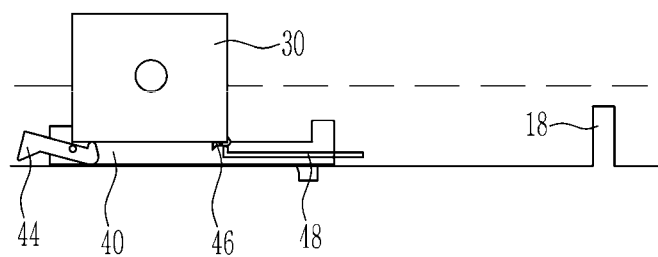

FIG. 10A to FIG. 10C illustrate states in which a first slider and a second slider are fixed in a door opened state of a sliding door device for a vehicle according to various exemplary embodiments of the present disclosure.

Referring to FIG. 10A to FIG. 10C, as the first slider 30 moves in the longitudinal direction of the second slider 40, one end portion of the locker pusher 48 is released from being pressed with respect to the first slider stopper 18, and the other end portion of the first slider stopper 18 comes into contact with the second slider locker 46 to rotate it. In the instant case, the second slider locker 46 is fixed to the first slider 30, so that the first slider 30 is fixed to the second slider 40. Furthermore, in the instant case, as described with reference to FIG. 6A and FIG. 6B, the first slider locker 44 is unlocked from the side rail, so that the first slider 30 and the second slider 40 may move along the side rail together.

As described above, according to the exemplary embodiment of the present disclosure, by employing the sliding door structure to which the rack/pinion gear engaging structure is applied, it is possible, by eliminating an amount of intrusion into the vehicle body of the door arm, to realize a flat structure of the vehicle body and thus it is possible to reduce a step height of the vehicle body.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sliding door apparatus for a vehicle, the sliding door apparatus comprising:
    a door that opens or closes a door opening formed in a vehicle body;
    a door arm provided with a first end portion rotatably connected to the door and a second end portion movable along a side sill of the vehicle body;
    a first slider pivotally coupled to the second end portion of the door arm so that the door arm rotates;
    a second slider coupled to the first slider to provide a path to which the first slider moves and to linearly move along the side sill; and
    a lower arm pinion gear which is rotatably coupled to the second end portion of the door arm and gear-engaged with the second slider to provide rotation force to the door arm so that the door arm rotates when the first slider moves in a longitudinal direction of the second slider.

2. The sliding door apparatus of claim 1, wherein the second slider includes a lower arm rack gear formed in a longitudinal direction of the side sill to be engaged with the lower arm pinion gear to provide a moving path when the lower arm pinion gear rotates.

3. The sliding door apparatus of claim 2,
    wherein the first slider is located between the second slider and the lower arm pinion gear, and
    wherein the lower arm pinion gear is engaged to the lower arm rack gear through an opening formed in the first slider.

4. The sliding door apparatus of claim 2, wherein the lower arm pinion gear rotates along the lower arm rack gear until the door arm is disposed in a direction perpendicular to the door when the door is opened and closed, and stops rotating after the door arm is disposed in the direction perpendicular to the door.

5. The sliding door apparatus of claim 4, wherein the second slider linearly moves along the side sill after the door arm is disposed in the direction perpendicular to the door.

6. The sliding door apparatus of claim 1, wherein at a first end portion of the second slider, a first slider locker that selectively limits a moving path of the first slider and selectively fixes the first slider to the second slider is provided.

7. The sliding door apparatus of claim 6, wherein when the door is opened, the first slider locker rotates as the first slider locker comes into contact with the first slider at the first end portion of the second slider by movement of the first slider so that the second slider is uncoupled from a side rail of the side sill.

8. The sliding door apparatus of claim 7, wherein when the door is closed, the first slider locker has elastic force to rotate to an original position of thereof as the first slider locker is released from contact with the first slider at the first end portion of the second slider by movement of the first slider.

9. The sliding door apparatus of claim 8, wherein the first slider locker rotates to the original position thereof, so that the second slider is coupled to the side rail of the side sill.

10. The sliding door apparatus of claim 1, wherein a first slider stopper that prevents the first slider from being separated from the second slider is provided in the side sill.

11. The sliding door apparatus of claim 10, wherein
at a first end portion of the second slider in contact with the first slider stopper, a rocker pusher extending through an end portion of the second slider to be movable in the longitudinal direction of the second slider is provided;
at a second end portion of the second slider, a second slider locker that rotates when in contact with the locker pusher is provided; and
the locker pusher rotates the second slider locker so that the first slider is fixed to or unfixed from the second slider.

12. The sliding door apparatus of claim 11, wherein when the door is closed, the locker pusher contacts with the second slider locker to rotate the second slider locker so that the second slider locker is unlocked from the first slider.

13. The sliding door apparatus of claim 12, wherein when the door is opened, the locker pusher contacts with the second slider locker to rotate the second slider locker so that pressure by the first slider stopper is released and the second slider locker is fixed to the first slider.

14. The sliding door apparatus of claim 1, wherein the second end portion of the door arm, the first slider, and the lower arm pinion gear are connected in a vertical direction of the vehicle body by a slider pin, and the door arm and the lower arm pinion gear are rotated around the slider pin.

15. The sliding door apparatus of claim 14, wherein the second end portion of the door arm is provided with first and second layers in a vertical direction thereof, and the lower arm pinion gear is coupled by the slider pin between the first and second layers of the door arm.

16. The sliding door apparatus of claim 1, wherein the first end portion of the door arm is connected to the door by a door pin to be hinge-rotated around the door pin.

* * * * *